May 6, 1924.
P. J. TIMBERLAKE
HINGED DRYING FRAME
Filed Jan. 8, 1923
1,493,294
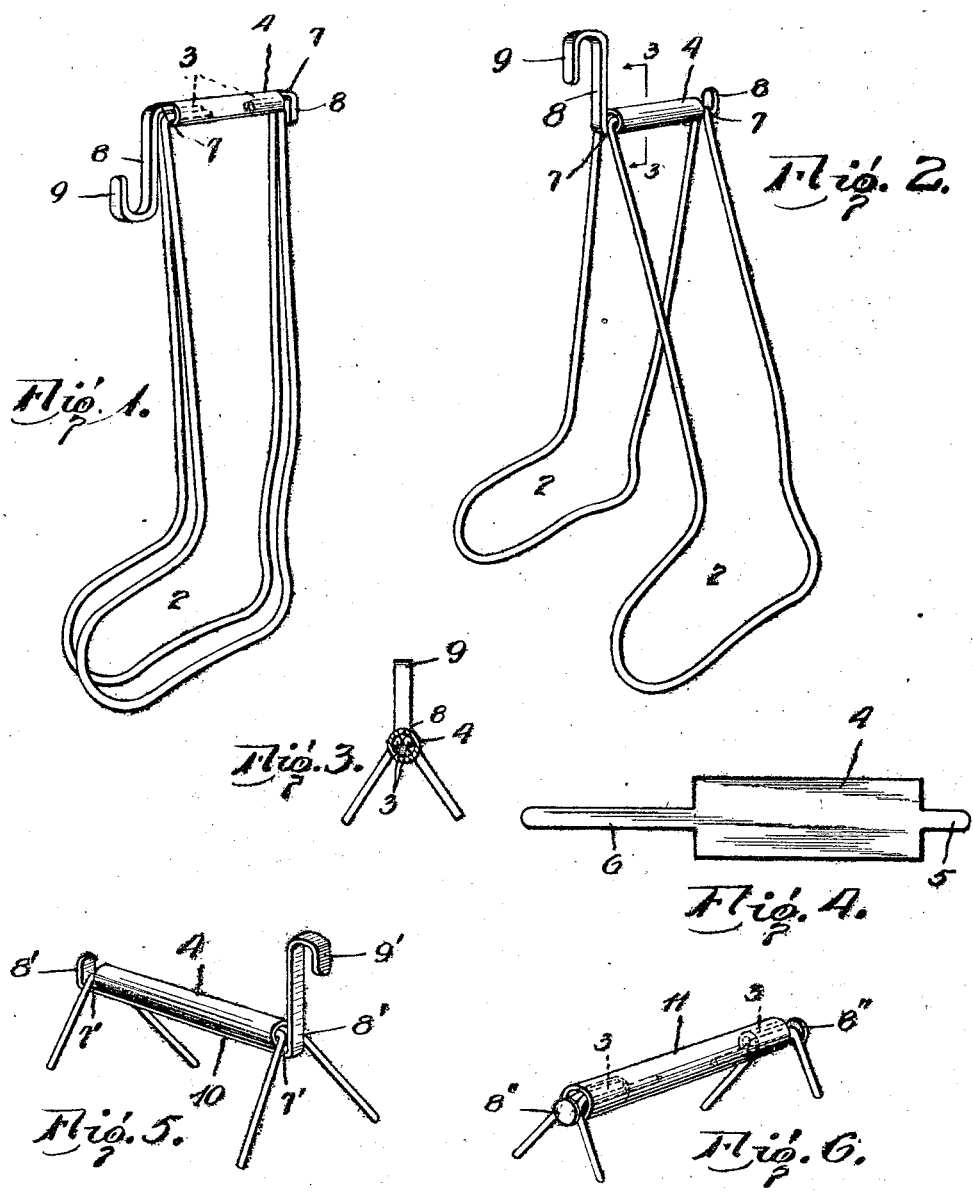

Patented May 6, 1924.

1,493,294

UNITED STATES PATENT OFFICE.

PAUL J. TIMBERLAKE, OF JACKSON, MICHIGAN.

HINGED DRYING FRAME.

Application filed January 8, 1923. Serial No. 611,483.

*To all whom it may concern:*

Be it known that I, PAUL J. TIMBERLAKE, a citizen of the United States, residing at Jackson, in the county of Jackson and State of Michigan, have invented certain new and useful Improvements in Hinged Drying Frames, of which the following is a specification.

My invention relates to frames on which tubular articles such as stockings, bags and the like may be dried, of the type illustrated in my Patent 875,135 dated December 31, 1907. My invention has for its object to reduce the cost of manufacture of these drying frames as compared with that shown in my aforesaid patent, to improve the construction thereof, and to make it feasible to enamel the wire of which the frames are constructed without having the enamel broken or chipped in the assembling of the parts of the frame and their subsequent use and manipulation.

In the accompanying drawings—

Figure 1 is a perspective view of a drying frame made according to my invention, the parts being in folded position, such as they occupy when the frame is not in use.

Fig. 2 is a perspective view of the frame when open and in position for use.

Fig. 3 is a sectional view taken on the line III—III of Fig. 2.

Fig. 4 is a view of a blank from which the ferrule or sleeve that unites the two parts of the frame is constructed.

Fig. 5 is a perspective view of a different embodiment of my invention from that shown in other views, parts being broken away.

Fig. 6 is a perspective view of still another form of the invention.

In the drawings 2, 2, indicate frames, formed of wire, over which articles to be dried may be drawn. The frames represented in the drawings are formed to support and shape stockings while being dried. They may be given other shapes than that shown when intended to be used in connection with other articles. The frames are of loop construction, the ends of the wires forming the frames being inturned so as to be in alignment with each other as represented at 3. In forming the drier two of the frames 2 are united by means of a ferrule or sleeve 4 that encircles the inturned ends 3, these parts of the two frames lying side by side within the ferrule or sleeve 4. The sleeve represented in Figs. 1 and 2 is formed from a blank such as represented in Fig. 4. From the opposite ends of this blank project tangs which are of different length, the shorter one being designated 5, the longer one 6. When the blank is rolled into tubular form the tangs project straight out therefrom. The free ends of the loop frames 2 may then be sprung apart and inserted into the longitudinal opening through the sleeve or ferrule. The two tangs are then bent, outside the angles of the ends 3 where they join the loop portion of the frame, so that they lie outside such ends, forming stops 8, 8. These are offset sufficiently far from the opposite ends of the ferrule or sleeve 4 to leave ample space for the swinging movements of the frames and yet are close enough thereto to prevent the hinged end bars of the frame from being sprung out of the uniting ferrule when the frames are being handled. The portions of the tangs between the stops 8 and the ends of the ferrule constitute bearings 7, 7, against the opposite edges of which the side bars of the frames 2 bear, when the frames are open, as represented in Fig. 2. The bearings 7 are sufficiently wide to hold the two frames apart and at such angle to each other as to permit free circulation of air between the articles which may be drawn over the frames, thus facilitating the rapid drying of such articles. After the articles have been dried and removed from the frames the latter may be turned to occupy the position indicated in Fig. 1, the frames then lying close together, thus facilitating their packing and storage. The outer or free end of the longer tang 6 is adapted to be bent to form a hook 9 by which the frames may be suspended.

In the form of invention represented in Fig. 5 the bearings 7' against which the frames rest to hold them apart, the stops 8' opposite the ends of the end bars of the frames to prevent these being sprung out of the connecting ferrule, and the suspending hook 9', are formed from a separate strip of metal 10 that is secured, as by means of solder, to the ferrule 4.

It is desirable that the frames 2 shall be coated with enamel. The manner of connecting the frames described is very advantageous when the frames are thus coated because it permits them to be of simple construction with no short bends in their formation and with no eyes which tend to fill during the enameling process, necessitating breaking the enamel to open such eyes.

In Fig. 6 I show a form of the invention in which the inturned ends 3, 3 of the two loop-shaped frames 2, 2 are supported in sockets or recesses formed in the ends of a cylindrical piece 11, which is preferably formed of wood. The stops 8″ carried by the piece 11, which offset from the ends thereof so as to leave spaces in which the side bars of the frames 2 may move as they swing relative to each other and to the piece 11, and serve to prevent the ends of the frames from accidentally springing out from the piece 11, are formed by the flat heads of nails or tacks which are driven into the opposite ends of the piece 11. This is a very cheap construction to manufacture and while not so desirable as that shown in the other views nevertheless possesses some of the features of novelty and advantage which are incident thereto.

What I claim is:

1. A pair of frames of loop formation with inturned ends in alignment with each other, a ferrule encircling the said ends of the two frames uniting them and forming a hinge connection between the frames, and stops projecting from the ends of the ferrule and offset therefrom leaving spaces in which the side bars of the frames may move as they swing relative to each other and serving to prevent the inturned ends of the side bars from being accidentally sprung out of the ferrule.

2. A pair of frames of loop formation with straight end bars, a ferrule encircling the said ends bars of the frames and forming a hinge connection between the frames, and bearings extending beyond the ends of the ferrule against the opposite edges of which the side bars of the frame rest and by which the frames are held apart when they are turned into open position.

3. A pair of frames of loop formation with inturned ends in alignment with each other, a ferrule encircling the said ends of the two frames uniting them and forming a hinge connection between the frames, bearings projecting outward beyond the ends of the ferrule against which the side bars of the frame bear, arranged to hold the frames apart when the frames are turned to open position, and stops at the ends of the said bearings disposed outside the ends of the frames that are within the ferrule, arranged to prevent such ends from being accidentally sprung out of the ferrule.

4. A frame such as described in claim 3 having one of the stops lengthened and formed into a supporting hook.

5. A hinge connection for uniting wire drying frames, consisting of a sleeve formed from a blank from the ends of which project narrow tangs, the body of the blank being shaped into an open-ended cylinder and the tangs continuing beyond the ends thereof and having their end portions disposed at an angle to the axis of the cylinder and offset from the ends thereof.

6. A pair of wire frames over which articles to be dried may be drawn each formed with inturned ends that are in alignment with each other, a body into the opposite ends of which the said inturned portions of the two frames are inserted, which body unites the two frames and forms a hinge connection between them, and stops projecting from the ends of the body and offset therefrom leaving spaces in which the side bars of the frames may move as they swing, and serving to prevent the inturned ends of the side bars from being accidentally sprung out of their seats in the ends of the said connecting body.

PAUL J. TIMBERLAKE.